US010246118B2

(12) United States Patent
Baumeister et al.

(10) Patent No.: US 10,246,118 B2
(45) Date of Patent: Apr. 2, 2019

(54) CLAMPING DEVICE FOR A LONGITUDINALLY ADJUSTABLE AND/OR HEIGHT-ADJUSTABLE STEERING COLUMN OF A VEHICLE

(71) Applicant: TRW Automotive GmbH, Alfdorf (DE)

(72) Inventors: Dirk Baumeister, Bocholt (DE); Kai Grebe, Siegburg (DE); Magnus Loyen, Viersen (DE)

(73) Assignee: TRW Automotive GmbH, Alfdorf (DE)

( * ) Notice: Subject to any disclaimer, the term of this patent is extended or adjusted under 35 U.S.C. 154(b) by 565 days.

(21) Appl. No.: 14/762,547

(22) PCT Filed: Jan. 22, 2014

(86) PCT No.: PCT/EP2014/051246
§ 371 (c)(1),
(2) Date: Jul. 22, 2015

(87) PCT Pub. No.: WO2014/114674
PCT Pub. Date: Jul. 31, 2014

(65) Prior Publication Data
US 2015/0360712 A1    Dec. 17, 2015

(30) Foreign Application Priority Data

Jan. 23, 2013   (DE) .................... 10 2013 100 672
Jul. 19, 2013   (DE) .................... 10 2013 107 728

(51) Int. Cl.
*B62D 1/185*   (2006.01)
*B62D 1/184*   (2006.01)
*B62D 1/19*    (2006.01)

(52) U.S. Cl.
CPC ............ *B62D 1/184* (2013.01); *B62D 1/185* (2013.01); *B62D 1/19* (2013.01); *Y10T 403/32008* (2015.01)

(58) Field of Classification Search
CPC .......... B62D 1/18; B62D 1/184; B62D 1/185; B62D 1/187; B62D 1/192
See application file for complete search history.

(56) References Cited

U.S. PATENT DOCUMENTS 5,301,567 A  *  4/1994  Snell ..................... B62D 1/184
                                                    280/775
6,092,957 A      7/2000  Fevre et al.
(Continued)

FOREIGN PATENT DOCUMENTS

CN    102630205 A     8/2012
CN    104203718 A    12/2014
(Continued)

OTHER PUBLICATIONS

Chinese 1st Office Action, Application No. CN 201480010075.6 dated Jul. 5, 2016.
(Continued)

*Primary Examiner* — Michael P Ferguson
(74) *Attorney, Agent, or Firm* — MacMillan, Sobanski & Todd, LLC (57) ABSTRACT

A clamping device for a longitudinally adjustable and/or height-adjustable steering column of a vehicle, having a device part and an actuating part which is movable relative to the device part between a release position, in which the steering column is longitudinally adjustable and/or height-adjustable, and a fixing position, in which the steering column is neither longitudinally adjustable nor height-ad-
(Continued)

justable, a damping unit being provided for damping a relative movement between the device part and the actuating part.

7 Claims, 5 Drawing Sheets

(56) References Cited

U.S. PATENT DOCUMENTS

| | | | |
|---|---|---|---|
| 7,861,615 B2* | 1/2011 | Harris | B62D 1/187 280/775 |
| 8,590,932 B2* | 11/2013 | Dietz | B62D 1/184 280/775 |
| 8,882,147 B2 | 11/2014 | Schnitzer et al. | |
| 8,991,863 B2 | 3/2015 | Hahn et al. | |
| 2003/0221505 A1 | 12/2003 | Schick et al. | |
| 2006/0273567 A1 | 12/2006 | Fix | |
| 2009/0020995 A1* | 1/2009 | Kim | B62D 1/184 280/775 |
| 2012/0266715 A1* | 10/2012 | Okada | B62D 1/184 74/493 |
| 2014/0318305 A1 | 10/2014 | Cron et al. | |
| 2015/0027263 A1 | 1/2015 | Kern et al. | |
| 2015/0053041 A1 | 2/2015 | Schnitzer et al. | |

FOREIGN PATENT DOCUMENTS

| | | | | |
|---|---|---|---|---|
| DE | 102006024749 A1 | 12/2006 | | |
| DE | 102009055973 B3 | 6/2011 | | |
| DE | 202012102166 U1 | 9/2012 | | |
| DE | 102012100486 B3 | 2/2013 | | |
| DE | 102012102556 B3 | 6/2013 | | |
| DE | 102011057104 A1 | 7/2013 | | |
| EP | 0900943 A1 | 3/1999 | | |
| EP | 1747967 A2 | 1/2007 | | |
| EP | 1795425 A2 | 6/2007 | | |
| EP | 1110843 A1 | 6/2011 | | |
| WO | WO 2007/069304 | * | 6/2007 | B62D 1/20 |
| WO | 2012/046075 A1 | 4/2012 | | |

OTHER PUBLICATIONS

Chinese 2nd Office Action, Application No. CN 201480010075.6, dated Mar. 2, 2017.
PCT International Preliminary Report on Patentability, Application No. PCT/EP2014/051246 filed Jan. 22, 2014, dated Aug. 6, 2015, English Translation.
German Search Report, Application No. DE 102013107728.5, dated Feb. 7, 2014.

* cited by examiner

CLAMPING DEVICE FOR A LONGITUDINALLY ADJUSTABLE AND/OR HEIGHT-ADJUSTABLE STEERING COLUMN OF A VEHICLE

CROSS-REFERENCE TO RELATED APPLICATIONS

This application is a national stage of International Application No. PCT/EP2014/051246 filed Jan. 22, 2014, the disclosures of which are incorporated herein by reference in entirety, and which claimed priority to German Patent Application No. 10 2013 100 672.8, filed Jan. 23, 2013, and German Patent Application No. 10 2013 107 728.5, filed Jul. 19, 2013, the disclosures of which are incorporated herein by reference in entirety.

BACKGROUND OF THE INVENTION

The invention relates to a clamping device for a longitudinally adjustable and/or height-adjustable steering column of a vehicle.

The steering column in a vehicle usually couples a steering wheel to a steering linkage of steerable vehicle wheels such that the vehicle wheels execute a steering movement when the steering wheel is rotated. To allow the steering wheel position to be individually adapted to the wishes and requirements of a particular driver, the steering column is increasingly configured to be adjustable with respect to its length and/or height (or inclination). As soon as the desired steering wheel position is reached, the steering column is fixed in place again such that in driving operation of the vehicle, it then only permits rotation of a steering shaft in relation to a longitudinal axis of the steering column in order to convert a steering wheel rotation into corresponding steering movements of the steerable wheels.

In this connection, clamping devices having a device part and an actuating part are already known from the prior art, the actuating part being movable relative to the device part between a release position, in which the steering column is longitudinally adjustable and/or height-adjustable, and a fixing position, in which the steering column is neither longitudinally adjustable nor height-adjustable. Such a generic clamping device for an adjustable steering column is described in US 2003/0221505 A1, for example.

After releasing the actuating part from its fixing position, the actuating part is urged towards the release position by a spring force and is accelerated. Unless the actuating part is manually guided and braked during its movement from the fixing position to the release position, the spring force results in a kinetic energy of the actuating part, which is abruptly dissipated in the release position, accompanied by the generation of an undesirable, high noise impulse.

BRIEF SUMMARY OF THE INVENTION

A feature of the invention is to provide a clamping device in which the actuating part can be moved with low noise, in particular from its fixing position to its release position, irrespective of its manual actuation and guiding.

This feature is achieved according to the invention by a clamping device of the type initially mentioned, in which a damping unit is provided for damping a relative movement between the device part and the actuating part. In particular during a movement from the fixing position to the release position, the actuating part accelerated by the spring force is braked by the damping unit with little effort, so that the kinetic energy of the actuating part can be dissipated almost without any noise.

The damping unit of the clamping device damps the relative movement between the device part and the actuating part here preferably over substantially the entire path of the actuating part between the release position and the fixing position. In this way, the kinetic energy of the actuating part is kept small over the entire path between the fixing position and the release position, which results in a low load on the components and therefore, in the final analysis, in a long service life of the clamping device.

Alternatively, the path of the actuating part between the release position and the fixing position may be divided into active damping sections and inactive damping sections. Here, the relative movement between the device part and the actuating part is damped only in the active damping sections, but not in the inactive damping sections. In this way, a fine tuning of the damping can be realized.

Preferably, the actuating part is adapted to swivel about an axis between the release position and the fixing position relative to the device part which is rotationally fixed with respect to the axis. The lever arm allows to effect such a swivel actuation requiring a lower force in comparison with a purely translational actuation. Since the actuating part is normally moved manually, the swivel actuation therefore results in an increased comfort for the driver, in particular in the case of a movement of the actuating part from the release position to the fixing position contrary to a spring force.

In one embodiment of the clamping device, the damping unit includes a first damping surface which is connected with the device part and arranged concentrically with an axis and a second damping surface which is connected with the actuating part and arranged concentrically with the axis, the two damping surfaces being adjacent to each other at least in sections and being spaced apart from each other by a gap, and a high-viscosity material, in particular a viscous fat or grease or a high-viscosity liquid, being provided in the gap for damping the relative movement between the device part and the actuating part. The damping unit having essentially two damping surfaces and a high-viscosity material is in this case simple in terms of design and can be produced at low cost. In addition, the result is a very durable damping unit involving a movement damping of maximum reliability since the damping is effected through inherent shearing forces within the high-viscosity material.

In this embodiment of the clamping device, the two damping surfaces are preferably located on the lateral area of a circular cylinder. This is simple to realize in terms of production engineering; as an alternative, the two damping surfaces may also be located on the lateral area of a circular cone.

Preferably, the device part is a ramp element, a radial outer face of the ramp element forming the first damping surface. The device part, configured as a ramp element, is therefore a multifunction part which takes on both a clamping function and a damping function within the clamping device. As an alternative, however, it is also conceivable that the device part is a tie bolt of the clamping device.

Particularly preferably, the damping unit includes a ring having a surrounding annular wall, the ring being connected with the actuating part, and a radial inner face of the annular wall forming the second damping surface.

In a design variant, the ring is connected with the actuating part with an interlocking fit in the circumferential direction and, more particularly, is made from a plastic material. The interlocking connection allows a simple and quick attachment to the actuating part, and the rather low stresses on the material allow the ring to be produced from a plastic material at low cost.

Alternatively, the ring may also be integrally integrated in the actuating part, the actuating part then preferably being a ramp element and being made from a sintered metal together with the integrally integrated ring. The integral integration of the ring into the actuating part allows the number of individual components to be reduced in an advantageous manner. When the actuating part is configured as a ramp element, it furthermore turns into a multifunction part which takes on both a clamping function and a damping function.

Besides, the ring and the actuating part may form a pot-shaped holder for the high-viscosity material. In this way, a "reservoir" is created for the high-viscosity material with little effort, so that even in case of a "loss of material" caused by numerous actuation cycles, for example, a sufficient amount of high-viscosity material always remains available for a reliable damping between the two damping surfaces and, consequently, a long service life of the damping unit is ensured.

In a further embodiment of the clamping device, the device part is a first ramp element that is rotationally fixed with respect to an axis and has first oblique surfaces, and the actuating part is a second ramp element that is adapted to swivel about the axis and has second oblique surfaces, the ramp elements being urged axially against each other by at least one spring element, and, upon a relative rotation about the axis, the first oblique surfaces and the second oblique surfaces cooperating such that the two ramp elements move relative to each other also in the axial direction.

Other advantages of this invention will become apparent to those skilled in the art from the following detailed description of the preferred embodiments, when read in light of the accompanying drawings.

DETAILED DESCRIPTION OF THE INVENTION

FIGS. 1 to 5 show a clamping device 10 for a longitudinally adjustable and/or height-adjustable steering column 12 (see FIG. 10) of a vehicle, having a device part 14 and an actuating part 16 which is movable relative to the device part 14 between a release position, in which the steering column 12 is longitudinally adjustable and/or height-adjustable, and a fixing position, in which the steering column 12 is neither longitudinally adjustable nor height-adjustable, a damping unit 18 being provided for damping a relative movement between the device part 14 and the actuating part 16.

Specifically, the actuating part 16 according to FIGS. 1 to 5 is adapted to swivel about an axis A between the release position and the fixing position relative to the device part 14 which is rotationally fixed with respect to the axis A. In the present exemplary embodiments, the actuating part 16 is manually swiveled here by means of an actuating lever 20 which, in relation to the swivel axis A, is attached to the actuating part 16 for joint rotation therewith. In particular, an axial extension 22 of the actuating part 16 (see FIG. 5) axially engages into an accurately fitting opening 24 of the actuating lever 20, so that an interlocking connection preventing relative rotation is produced between the actuating part 16 and the actuating lever 20 in the circumferential direction. Subsequently, the actuating lever 20 and the actuating part 16 are fixed to each other also in the axial direction, for example crimped, welded, bonded or connected to each other in some other way.

Figure 1:
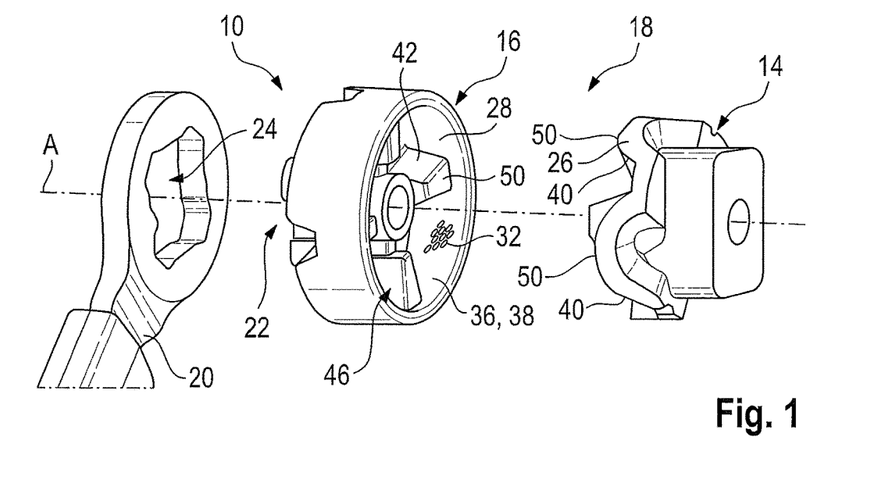
FIG. 1 shows a perspective exploded view of a clamping device according to a first embodiment of the invention.

The damping unit 18 includes a first damping surface 26 which is firmly connected with the device part 14 and arranged concentrically with the axis A and a second damping surface 28 which is firmly connected with the actuating part 16 and arranged concentrically with the axis A, the two damping surfaces 26, 28 being adjacent to each other at least in sections and being spaced apart from each other by a radial gap 30 that is continuous in the circumferential direction. As indicated in FIGS. 1 and 4, a high-viscosity material 32 for damping the relative movement between the device part 14 and the actuating part 16 is provided in the gap 30. Specifically, the high-viscosity material 32 is a viscous fat or a high-viscosity liquid, for example, the shearing forces occurring in the high-viscosity material 32 being made use of for damping a relative movement of the two damping surfaces 26, 28. For the shearing forces to be sufficiently high for an effective movement damping, a gap width s of the gap 30 (see FIG. 3) should be substantially constant and not too large. In practice, it has turned out to be advantageous if the gap width s≤0.8 mm, in particular if s≤0.5 mm and, particularly preferably, if s≈0.1-0.4 mm.

Compared with pure end stop dampers, the present damping unit 18 has the advantage that it damps the relative movement between the device part 14 and the actuating part 16 over the entire path of the actuating part 16 between the release position and the fixing position. Therefore, the relative velocity between the device part 14 and the actuating part 16 and also the maximum kinetic energy reached remain comparatively low and may be dissipated or reduced at the end of the relative movement, involving low stress on the component parts. In addition to a lower noise development, this also results in a longer service life of the clamping device 10.

To allow a better fine tuning of the damping, it is also conceivable, however, that the path of the actuating part between the release position and the fixing position includes both active damping sections and inactive damping sections, the relative movement between the device part and the actuating part being damped by the damping unit only in the active damping sections, but not in the inactive damping sections.

According to FIGS. 1 to 5, the two damping surfaces 26, 28 are each located on the lateral area of a circular cylinder.

In this case, the high-viscosity material 32 can damp both a translational relative movement in the axial direction and a rotational relative movement in the circumferential direction, since the gap width s remains substantially constant for both relative movements. In particular for (mainly) rotational relative movements, the damping surfaces 26, 28 may, alternatively, also each be located on the conical lateral area of a circular cone.

According to FIG. 1, the device part 14 more particularly is a ramp element, a radial outer face of the ramp element forming the first damping surface 26. Since the axial clamping function of the clamping device 10 is realized by means of the device part 14 configured as a ramp element, the device part 14 is in this case preferably produced from a sintered metal.

Figure 5:
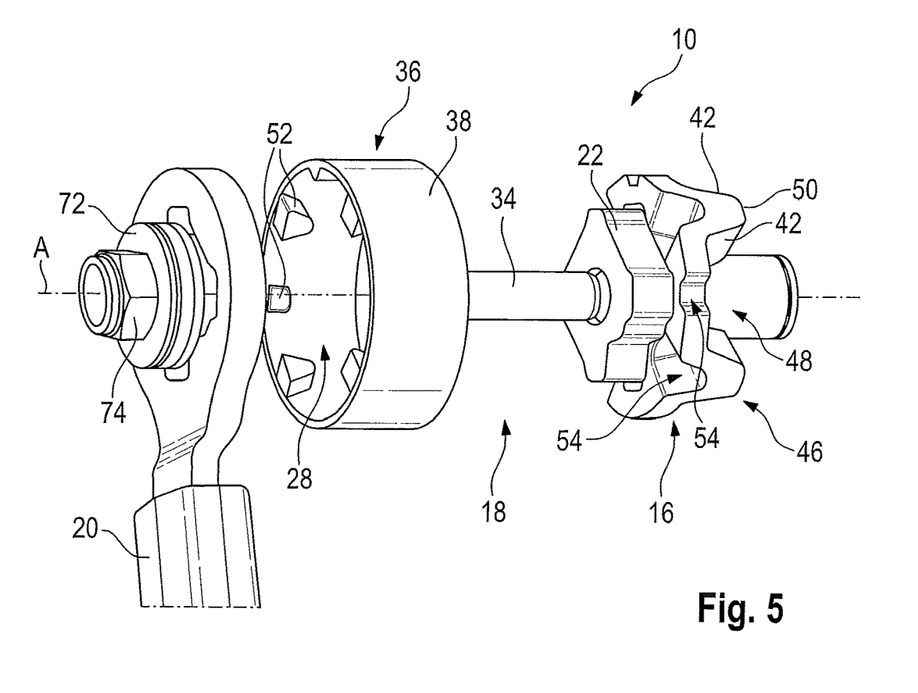
FIG. 5 shows a perspective exploded view of a clamping device according to a second embodiment of the invention.

Alternatively or additionally, the device part 14 may also be a tie bolt 34 as can be seen in FIG. 5, of the clamping device 10, the tie bolt being mounted non-rotationally relative to the axis A.

The damping unit 18 further includes a ring 36 having a surrounding annular wall 38, the ring 36 being connected with the actuating part 16 so as to prevent relative rotation, and a radial inner face of the annular wall 38 forming the second damping surface 28.

As can be seen in the detail view of the actuating part 16 according to FIG. 4, in the present case the actuating part 16 includes both a radially outer ring 36 and a radially inner ring 36. The radial inner face of the annular wall 38 of the radially outer ring 36 may form the second damping surface 28 here and cooperate with the radial outer face of the device part 14 and the high-viscosity material 32 as the damping unit 18.

Alternatively or additionally, the radial inner face of the annular wall 38 of the radially inner ring 36 may also form the second damping surface 28 and cooperate with a radial outer face of the tie bolt 34 and the high-viscosity material 32 as the damping unit 18.

It should be emphasized in this connection, however, that due to the larger damping surfaces 26, 28 and the larger lever arm, the damping unit 18 which is formed by the radial outer face of the device part 14 and the radial inner face of the annular wall 38 of the radially outer ring 36 offers a considerably more effective and higher damping of the relative movement between the device part 14 and the actuating part 16.

FIGS. 1 to 4 show the clamping device 10 according to a first embodiment, with reference to which the operating principle of the clamping device 10 will be briefly explained.

FIG. 1 shows part of the actuating lever 20, the actuating part 16 which is connected for joint rotation with the actuating lever 20, and the device part 14 in a perspective exploded view.

Figure 2:
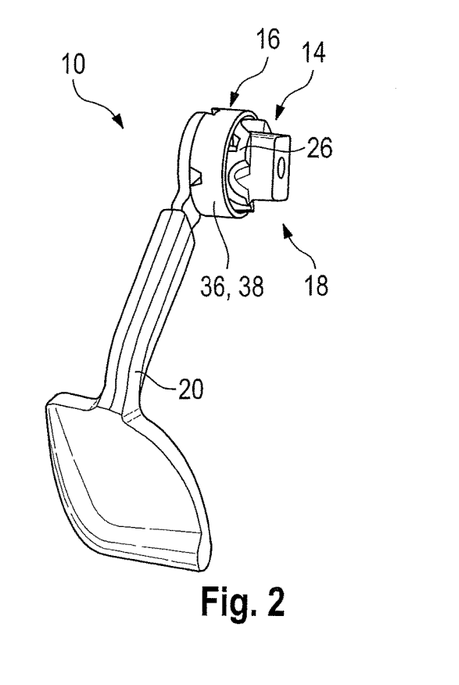
FIG. 2 shows a perspective view of the clamping device according to FIG. 1 in the assembled state.

FIG. 2 illustrates the components from FIG. 1 in an assembled state, the clamping device 10 being in its fixing position.

Figure 3:
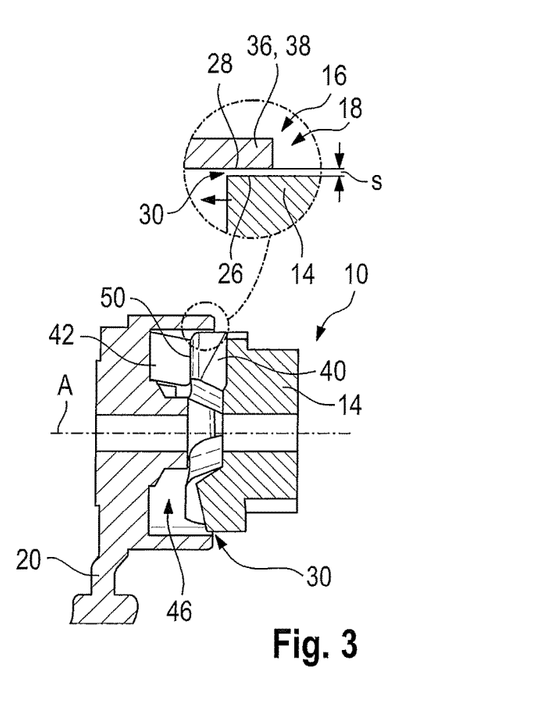
FIG. 3 shows a longitudinal section taken through the clamping device according to FIG. 1 in a fixing position.
Figure 4:
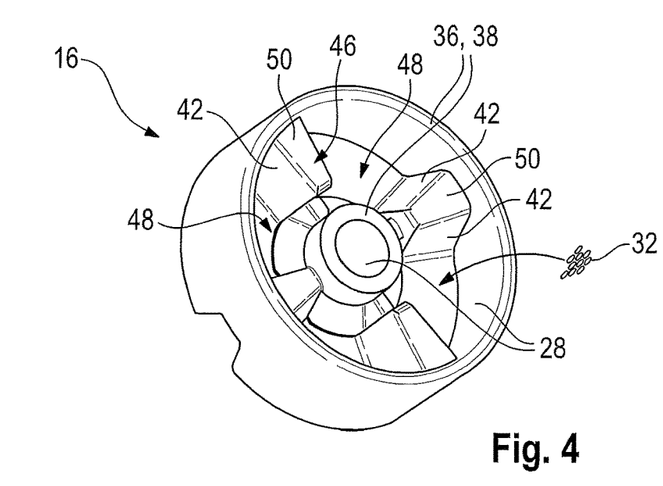
FIG. 4 shows a perspective detail view of an actuating part for the clamping device according to FIG. 1.

FIG. 3 shows a longitudinal section taken through the clamping device 10 according to FIG. 2. Here, the device part 14 is a first ramp element that is rotationally fixed with respect to the axis A and has first oblique surfaces 40, and the actuating part 16 is a second ramp element that is adapted to swivel about the axis A between the release position and the fixing position and has second oblique surfaces 42, the ramp elements being urged axially against each other by at least one spring element 44 (see FIG. 10), the first oblique surfaces 40 and the second oblique surfaces 42, upon a relative rotation about the axis A, cooperating such that the two ramp elements move relative to each other also in the axial direction.

The two ramp elements include—each alternately in the circumferential direction—axial clamping cams 46 having oblique surfaces 40 and 42, respectively, and depressions 48.

When the clamping cams 46 of the first ramp element engage in the depressions 48 of the second ramp element and vice versa, the clamping device 10 or the actuating part 16 is in the release position, in which the steering column 12 is longitudinally adjustable and/or height-adjustable. Now when the actuating part 16, configured as the second ramp element, is swiveled in relation to the device part 14, configured as the first ramp element, the first and second oblique surfaces 40, 42 of the clamping cams 46 slide on one another, as a result of which the device part 14 and the actuating part 16 move axially away from each other. In the process, the actuating part 16 and the device part 14 are swiveled in relation to each other to such an extent until, ultimately, axial front faces 50 of the clamping cams 46, which extend substantially perpendicularly to the axis A, are supported against each other. The actuating part 16, or the entire clamping device 10, has then reached the fixing position according to FIG. 3, in which the steering column 12 is clamped such that it is neither longitudinally adjustable nor height-adjustable.

Turning to the perspective detail view of the actuating part 16 in FIG. 4, it is clearly shown that the ring 36 according to the first embodiment of the clamping device 10 is integrally integrated in the actuating part 16. The actuating part 16 is a ramp element here and is produced from a sintered metal together with the integrally integrated ring 36.

Furthermore, the ring 36 and the actuating part 16 form a pot-shaped holder or receptacle for the high-viscosity material 32, from which, by actuating the clamping device 10, high-viscosity material 32 can always be pressed between the damping surfaces 26, 28 again in order to damp the relative movement between the actuating part 16 and the device part 14. This pot-shaped holder serving as a reservoir for the high-viscosity material 32 makes sure that there is a reliable damping function over a large number of actuating cycles of the clamping device 10, and therefore, in the final analysis, ensures a long service life of the movement-damped clamping device 10.

In respect of the clamping device 10, variant designs of the first embodiment are also conceivable in which the actuating lever 20 is in the form of an injection molded plastic part. In this case, the sintered actuating part 16 according to FIG. 4 is preferably directly integrated into the actuating lever 20 by insert molding during the manufacture of the actuating lever 20. The above-mentioned connection of the actuating lever 20 with the actuating part 16 by crimping, welding, bonding or the like can be dispensed with as a result of this direct insert molding of the actuating part 16.

FIG. 5 shows the clamping device 10 according to a second embodiment, which differs from the first embodiment according to FIGS. 1 to 4 merely in that the ring 36 and the actuating part 16 are two separate component parts, the ring 36, however, being connected with the actuating part 16 in the circumferential direction with an interlocking fit and for joint rotation therewith. For realizing the interlocking connection, the annular wall 38 includes projections 52 which are directed radially inwards and can engage into corresponding recesses 54 of the actuating part 16.

The ring 36 is axially clamped by the axial fixing of the actuating lever 20 to the actuating part 16 as already mentioned above, so that a strong, pre-assembled structural unit is obtained from the actuating lever 20, the ring 36, and the actuating part 16. Accordingly, the ring 36 and the actuating part 16 form a pot-shaped holder for the high-viscosity material 32 in this embodiment as well.

The actuating part 16, which is subjected to relatively high stresses due to the clamping function, is preferably produced from a sintered metal, whereas the ring 36, which can be produced separately and is subjected to considerably lower stresses, is preferably a plastic ring, for reasons of cost and/or weight.

With respect to the clamping device 10, variant designs of the second embodiment are also conceivable in which the actuating lever 20 is in the form of an injection molded plastic part, the ring 36 according to FIG. 5 fabricated from a plastic material preferably being integrally integrated in the actuating lever 20. More particularly, in this case the sintered actuating part 16 according to FIG. 5 can be directly integrated into the actuating lever 20 by insert molding during the manufacture of the actuating lever 20. The above-mentioned connection of the actuating lever 20 with the actuating part 16 by crimping, welding, bonding or the like can be dispensed with as a result of this direct insert molding of the actuating part 16.

Figure 6:
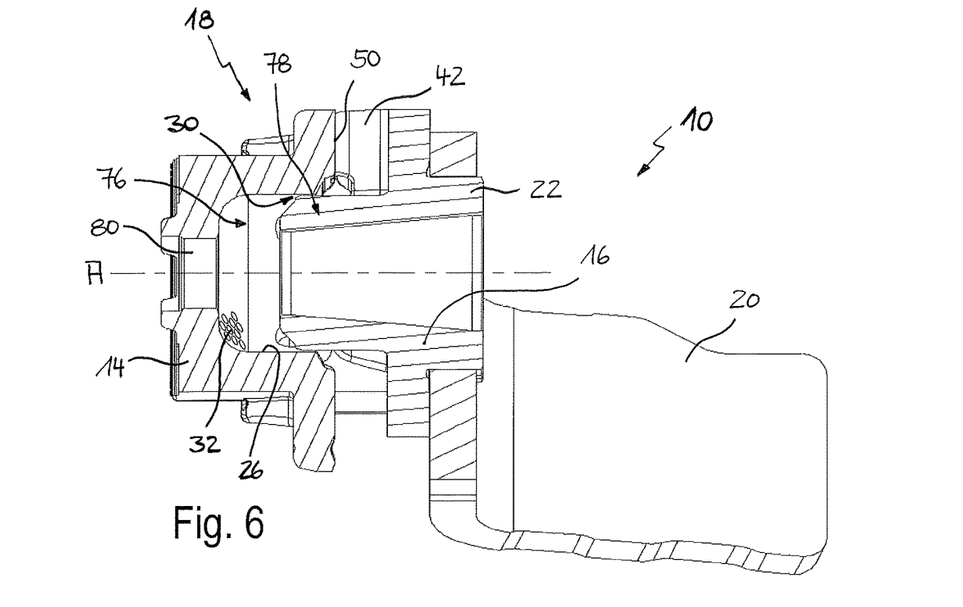
FIG. 6 shows a longitudinal section taken through a clamping device according to a third embodiment of the invention in a fixing position.
Figure 7:
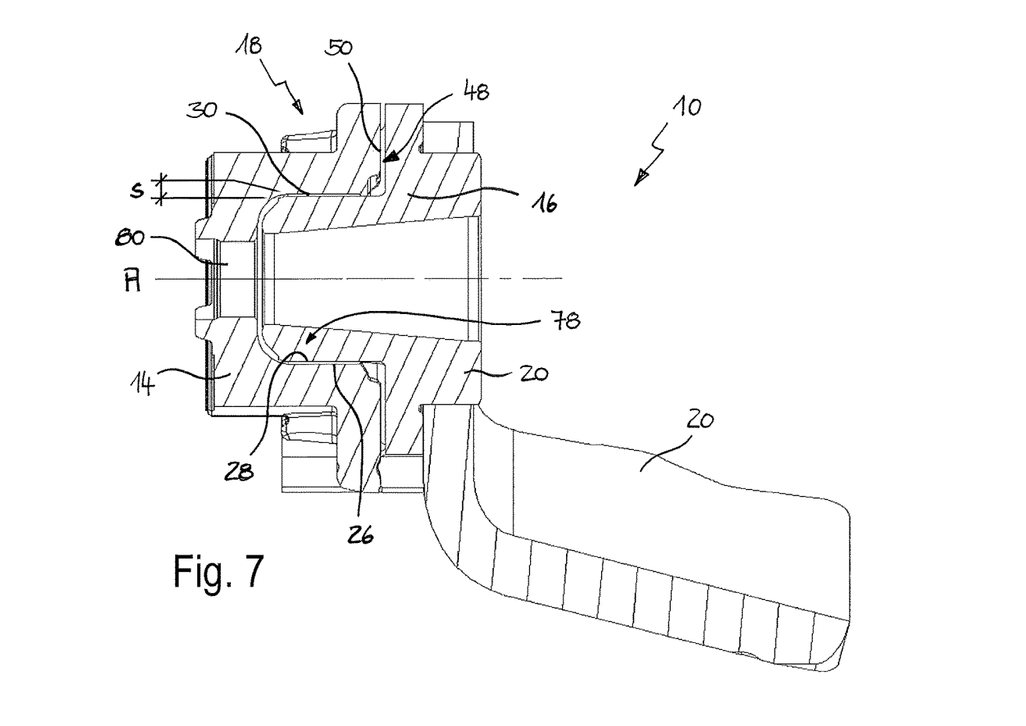
FIG. 7 shows a longitudinal section taken through the clamping device according to FIG. 6 in a release position.

FIGS. 6 and 7 show the clamping device 10 in accordance with a third embodiment in the fixing position and in the release position, respectively. Here, the third embodiment of the clamping device 10 differs from the previously described embodiments merely by design details with respect to the specific arrangement of the damping surfaces 26, 28 of the damping unit 18, for which reason reference is explicitly made to the description of FIGS. 1 to 5 with regard to the operating principle and the general design principle of the clamping device 10, and the following is merely a discussion of differences in the design of the third embodiment.

Figure 8:
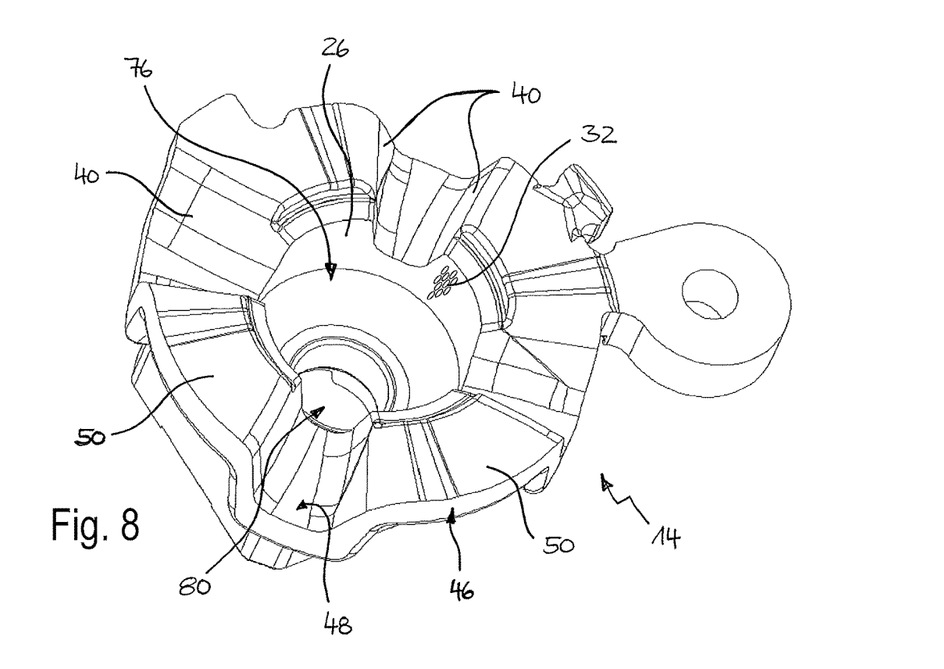
FIG. 8 shows a perspective view of a device part of the clamping device according to FIGS. 6 and 7.
Figure 9:
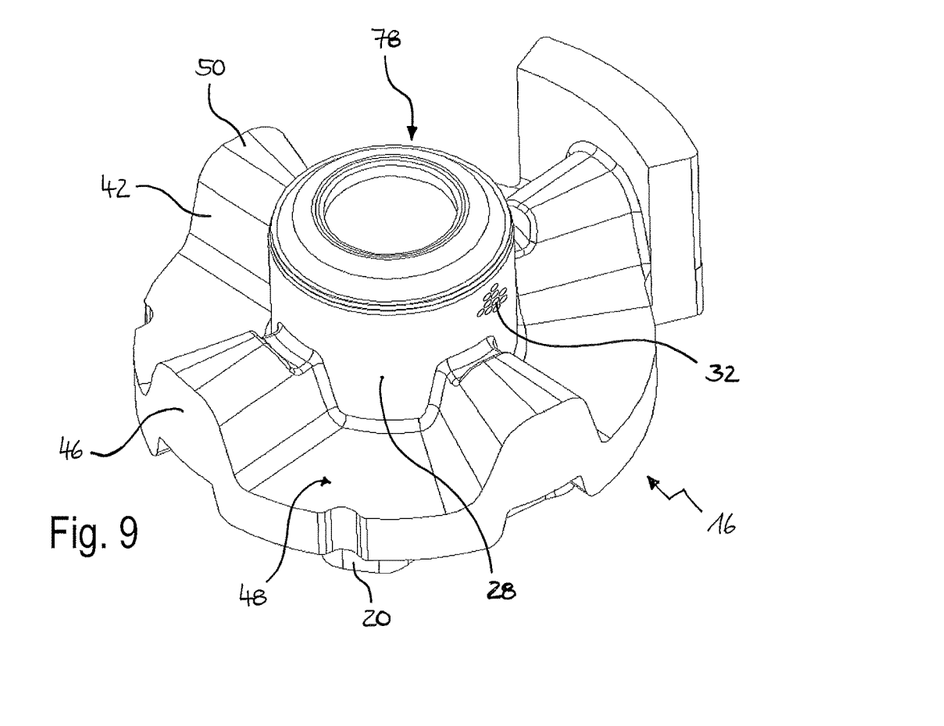
FIG. 9 shows a perspective view of an actuating part of the clamping device according to FIGS. 6 and 7.

For greater clarity of the component geometry in the third embodiment of the clamping device 10, FIGS. 8 and 9 illustrate perspective detail views of the device part 14 and of the actuating part 16, respectively.

By analogy with the first embodiment, described in detail in terms of structure and function with reference to FIGS. 1 to 4, the device part 14 according to FIG. 8 is a first ramp element that is rotationally fixed with respect to the axis A and has first oblique surfaces 40, and the actuating part 16 according to FIG. 9 is a second ramp element that is adapted to swivel about the axis A between the release position and the fixing position and has second oblique surfaces 42. Since the axial clamping function of the clamping device 10 is implemented by means of the two ramp elements, the device part 14 and the actuating part 16 are in this case preferably produced from a sintered metal.

In contrast to the first and second embodiments of the clamping device 10, the device part 14 according to FIG. 8 includes a circular cylindrical recess 76 which is concentric with the axis A, a radial inner face of the device part 14 being adjacent to the recess 76 and constituting the first damping surface 26. Correspondingly, the actuating part 16 according to FIG. 9 includes a circular cylindrical extension 78, a radial outer face of the extension 78 constituting the second damping surface 28 and cooperating with the radial inner face of the device part 14 and the high-viscosity material 32 as the damping unit 18. The circular cylindrical recess 76 creates a pot-shaped holder or receptacle in the device part 14 for the high-viscosity material 32, the circular cylindrical extension 78 of the actuating part 16 plunging into the pot-shaped holder in the release position according to FIG. 7, so that by actuating the clamping device 10, high-viscosity material 32 is always pressed into the gap 30 between the damping surfaces 26, 28 again in order to damp the relative movement between the actuating part 16 and the device part 14.

In the third embodiment according to FIGS. 6 to 9, the circular cylindrical damping surfaces 26, 28 are arranged radially inward of the clamping cams 46 and depressions 48 of the device part 14 and the actuating part 16, respectively, and have a larger diameter than the tie bolt 34 or a tie bolt opening 80 in the device part 14. Compared with a damping unit 18 which is formed by the radial outer face of the tie bolt 40, the radial inner face of the radially inner ring 36 (see FIGS. 4 and 5) and the high-viscosity material 32, the damping unit 18 according to FIGS. 6 to 9 offers a considerably more effective and increased damping of the relative movement between the device part 14 and the actuating part 16, owing to the larger damping surfaces 26, 28 and the larger lever arm. However, compared with a damping unit 18 which is formed by the radial outer face of the device part 14, the radial inner face of the radially outer ring 36 (see FIG. 1) and the high-viscosity material 32, the damping unit 18 according to FIGS. 6 to 9 offers a lower damping of the relative movement between the device part 14 and the actuating part 16, due to the smaller damping surfaces 26, 28 and the smaller lever arm.

Accordingly, in the third embodiment of the clamping device 10, an advantageous "medium" damping of the damping unit 18 is obtained, which, for one thing, dissipates the kinetic energy in a reliable manner and with low noise and, for another thing, makes sure that the actuating part 16 (acted upon by the spring element 44) is moved relative to the device part 14 as far as to the release position and is not stopped before by too high a damping.

Figure 10:
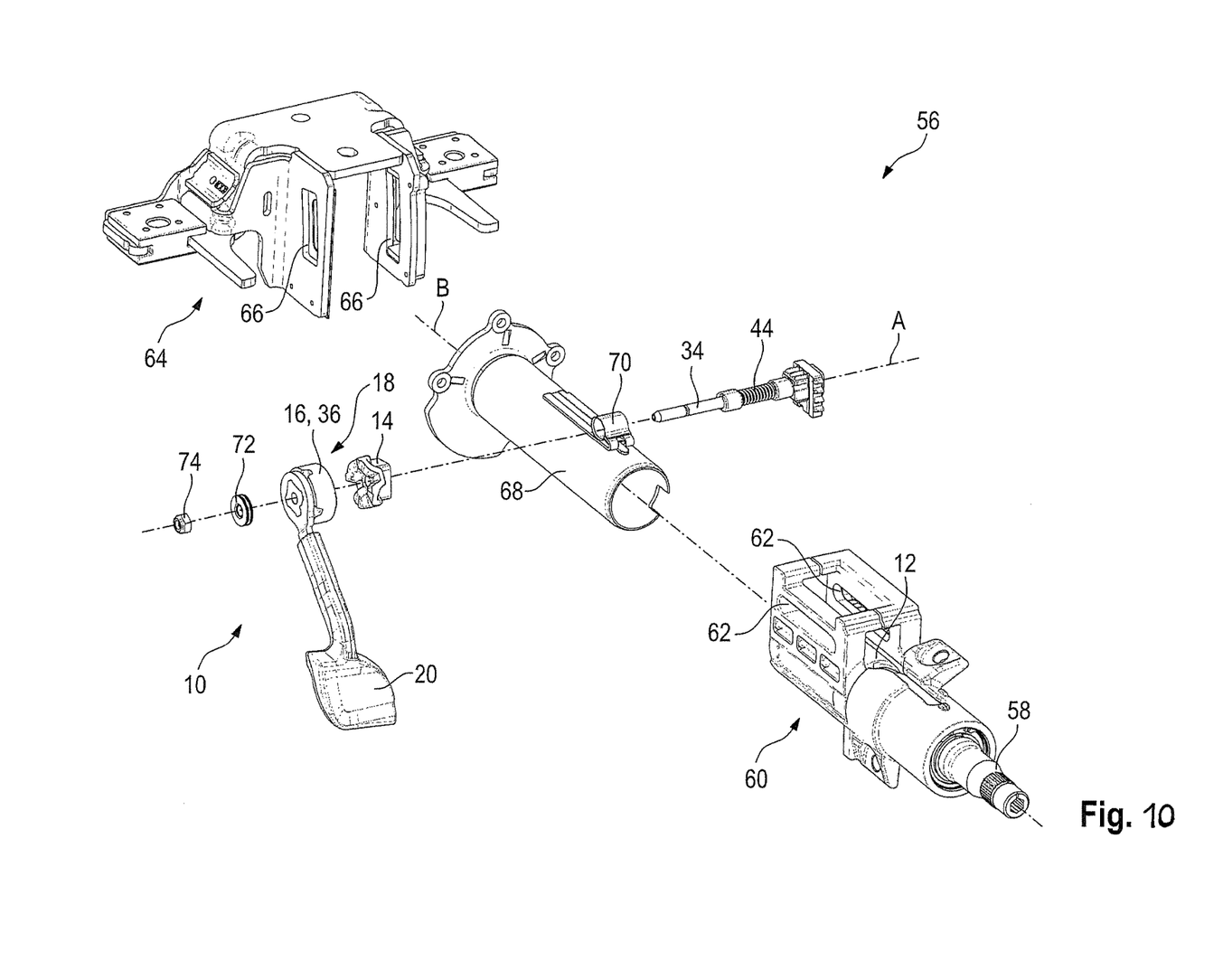
FIG. 10 shows a perspective view of a steering column adjustment assembly with a clamping device according to FIGS. 1 to 4.

To illustrate the use of the clamping device 10 more clearly, FIG. 10 shows a steering column adjustment assembly 56 in which a clamping device 10 according to FIGS. 1 to 4 is employed.

The steering column 12 having a steering shaft 58 rotatable about a steering column axis B can be seen here, the steering column 12 being received in a first clamping carrier 60 which has a slot 62 for longitudinal adjustment of the steering column 12.

In addition, provision is made for a second clamping carrier 64 which is fixed to the vehicle body and has a slot 66 for adjusting the inclination or height of the steering column 12. The device part 14 is held at the second clamping carrier 64 so as to be rotationally fixed with respect to the axis A and can only be displaced along the slot 66.

Further provided is a telescopic tube 68 into which the steering column 12 can be inserted and to which the clamping device 10 is fastened. The tie bolt 34 here is guided through the slots 62, 66 of the clamping carriers 60, 64, a sleeve 70 optionally provided on the telescopic tube 68 and also through the device part 14, the actuating part 16 and the actuating lever 20, and is finally secured with a roller thrust bearing 72 and a bolt nut 74. The sleeve 70 is part of an optional energy absorption means here, by which energy can be dissipated in a defined manner in the event of a crash.

The two clamping carriers 60, 64 act as spring elements with respect to the axis A and, just like the spring element 44, they act upon the tie bolt 34 with a tensile force. This ensures in the release position of the clamping device 10 that the steering column 12 in the clamping carriers 60, 64 is both longitudinally adjustable and height-adjustable by means of the slots 62, 66. In the fixing position, however, the clamping carriers 60, 64 are axially compressed with respect to the axis A by the clamping device 10 and, in the process, are pressed against the steering column 12 such that the steering column is firmly clamped and fixed in position.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A clamping device for a longitudinally adjustable and/or height-adjustable steering column of a vehicle, comprising:
   a device part having circumferentially spaced first clamping cams and first depressions therebetween axially extending from an annular face thereof, wherein the first clamping cams have radially extending first oblique surfaces, and
   an actuating part which having circumferentially spaced second clamping cams and second depressions therebetween, wherein the second clamping cams have radially extending second oblique surfaces, and wherein the actuating part is movable relative to the device part between a release position, in which the first clamping cams are engaged with the second depressions, the second clamping cams are engaged with the first depressions, and the steering column is unclamped and longitudinally adjustable and/or height-adjustable, and a fixing position, in which the first and second oblique surfaces slide on one another, the device part and the actuating part move axially away from each, and the steering column is clamped and neither longitudinally adjustable nor height-adjustable,
   wherein the actuating part is adapted to swivel about an axis between the release position and the fixing position relative to the device part which is rotationally fixed with respect to the axis,
   wherein a damping unit is provided for damping a relative movement between the device part and the actuating part, wherein the damping unit includes a ring having a surrounding annular wall around a periphery of a body of the actuating part and a radial spacing between the first clamping cams, the second cams extend from a radial inner face of the annular wall, and the annular wall defines a gap between the device part and the actuating part,
   wherein the damping unit includes a first damping surface which is connected with the device part on an outer circumferential face of a body of the device part and arranged concentrically with the axis and a second damping surface which is connected with the actuating part on the radial inner face of the annular wall and arranged concentrically with the axis,
   the first and second damping surfaces being adjacent to each other at least in sections and being spaced apart from each other by the gap, and
   a high-viscosity fluid being provided in the gap for damping the relative movement between the device part and the actuating part, wherein the high-viscosity fluid contacts the device part and the actuating part.

2. The clamping device according to claim 1, wherein the damping unit damps the relative movement between the device part and the actuating part over substantially an entire path of the actuating part between the release position and the fixing position.

3. The clamping device according to claim 1, the ring being connected with the actuating part.

4. The clamping device according to claim 3, wherein the ring is integrally integrated in the actuating part.

5. The clamping device according to claim 4, wherein the actuating part is a ramp element and is made from a sintered metal together with the integrally integrated ring.

6. The clamping device according to any of claim 3, wherein the ring and the actuating part form a pot-shaped holder for the high-viscosity fluid.

7. The clamping device according to claim 1, wherein the device part is a first ramp element that is rotationally fixed with respect to an axis and has the first oblique surfaces, and the actuating part is a second ramp element that is adapted to swivel about the axis and has the second oblique surfaces, the first and second ramp elements being urged in an axial direction against each other by at least one spring element, and, upon a relative rotation about the axis, the first oblique surfaces and the second oblique surfaces cooperating such that the first and second ramp elements move relative to each other also in the axial direction.

\* \* \* \* \*